Patented June 2, 1942

2,284,839

UNITED STATES PATENT OFFICE 2,284,839

CELLULOSE SPINNING SOLUTION AND FILAMENT PRODUCED THEREFROM

George A. Paine, Providence, R. I., assignor to Hercules Powder Company, Wilmington, Del., a corporation of Delaware No Drawing. Application October 2, 1940, Serial No. 359,359

11 Claims. (Cl. 260—9)

This invention relates to a rayon spinning solution containing a synthetic resin as a modifying agent and to the improved cellulose filament obtained therefrom. More particularly, the invention relates to use of a synthetic resin in a rayon spinning solution to provide a rayon having improved tensile strength and increased softness.

Various materials have been incorporated in rayon spinning baths to reduce the luster of the yarn. Pigments such as titanium dioxide, terpene alcohols such as terpineol or pine oil, and a variety of other chemicals have been used in rayon manufacture because of their property of reducing the luster of the rayon yarn. While these materials serve to deluster the rayon they do not otherwise improve the properties of the yarn, particularly the strength of the filaments and yarns obtained. In many instances they operate to decrease the strength characteristics of the filaments. This is undesirable since a rayon fiber of increased tensile strength has been desired.

It is an object of this invention to provide a rayon spinning solution which will produce a rayon of improved tensile strength.

It is another object to provide a cellulose filament or yarn of improved strength characteristics.

Other objects of the invention will appear hereinafter.

These objects are accomplished in accordance with this invention by incorporating a synthetic resin produced by reaction of a terpene-maleic anhydride condensate with a polyhydric alcohol in a rayon spinning solution containing, for example, cellulose xanthate and alkali, and spinning rayon from the solution in the usual manner. After the usual finishing treatment the rayon filaments produced will contain the terpene-maleic anhydride, polyhydric alcohol resin intimately associated with and distributed through the cellulose filaments. The rayon will possess improved strength due to the incorporation of the resin.

The terpene-maleic anhydride, polyhydric alcohol resins utilized in this invention may be prepared by methods well known in the art. They may include reaction products of terpene-maleic anhydride condensates with polyhydric alcohols such as glycerol, ethylene glycol, propylene glycol, diethylene glycol, triethylene glycol, etc. In general, the usual modifying agents such as rosin or other natural resin acids, fatty acids such as stearic, palmitic, oleic acids or other monobasic acids may be included in the resins. The terpene-maleic anhydride condensate used in preparing the resins utilized in this invention may be produced by the condensation of maleic anhydride with terpenes containing conjugated double bonds, such as alpha-terpinene, or with terpenes which do not contain conjugated double bonds, such as alpha-pinene, beta-pinene, dipentene, limonene, terpinolene, etc.

The terpene-maleic anhydride resin may be incorporated in the viscose solution in any suitable manner. Preferably, it will be incorporated in the viscose solution in the form of an aqueous dispersion of the resin. Aqueous dispersions of the resins may be readily prepared by treating the resin with a water-soluble alkaline material capable of forming a water-soluble salt of the resin, such as for example, ammonium hydroxide, alkali metal hydroxides as sodium or potassium hydroxide, alkali carbonates as sodium carbonates, or water-soluble organic bases as alkylamines and alklolamines, as ethylamine, triethanolamine, diaminopropanol, butanolamine, or heterocyclic amines as morpholine. By means of the water-soluble salt the resin may be dispersed in water to give either a clear solution or an emulsion.

The aqueous dispersion of the resin may be readily prepared by adding the alkaline material to the resin or to a mixture of the resin and water, or the resin may be added to an aqueous solution of the alkaline material. It is usually desirable to carry out the dispersion at a temperature above room temperature, or at a temperature at which the resin will be liquid. In some instances it may be found desirable to first dissolve the resin in a small amount of a solvent, such as, for example, acetone, alcohol, ethyl acetate, toluol, methyl cellosolve, etc., and disperse the resin solution in water by means of the alkaline material.

In producing the modified viscose spinning solution in accordance with this invention the aqueous dispersion of the terpene-maleic anhydride resin is introduced into the viscose prior to the spinning thereof. It may be dispersed directly in the viscose or it may be added to the mixture of sodium hydroxide, water and cellulose xanthate used to make the viscose. It will be distributed uniformly and completely throughout the viscose solution. The quantity of resin added to the viscose may be varied to produce the desired effect. Generally, an amount of resin will be incorporated which will be equivalent to about two per cent to about twenty-five per cent by weight of the cellulose content of the viscose, and preferably about five per cent to about fifteen per cent.

The spinning solution containing the cellulose xanthate and the terpene-maleic anhydride resin will then be spun and the filaments finished in the usual manner. The finishing operations of washing, desulphurizing, bleaching, drying, etc. do not remove the resin.

While the terpene-maleic anhydride resin in many instances exert a delustering effect on the rayon, it will be desirable to include one of the usual delustering agents in the viscose solution before spinning. Thus, mineral oil, pine oil, a terpene alcohol, a pigment as titanium dioxide, or any of the other common delustrants may be employed.

The rayon filaments produced in accordance with this invention will be characterized generally by an improved tensile strength. They will possess excellent softness and color. In most cases, the color will be an improvement over rayon without the resin. The elasticity will also be improved.

The following examples serve to illustrate my invention.

Example 1

One hundred parts by weight of the condensation product of maleic anhydride and a terpene cut boiling within the range 182° C. to 190° C. as described in U. S. Patent No. 1,993,031 to Ernest G. Peterson, and 36 parts by weight of ethylene glycol were heated together with agitation at a temperature of about 205° C. to about 215° C. for about 7 hours. Excess glycol was then removed under reduced pressure. The resin resulting had an acid number of 43 and a melting point (Hercules drop method) of 98° C. The resin was dissolved in alcohol to give a 75 per cent by weight solution. Then 26.7 parts by weight of the alcohol solution were added with agitation to 68.3 parts by weight of water containing 5 parts by weight of 28 per cent ammonium hydroxide to give an aqueous dispersion of the resin containing 20 per cent by weight of the resin. To 100 parts by weight of a ripened viscose spinning solution containing about 7 per cent cellulose and 6 per cent sodium hydroxide, 4.4 parts by weight of the aqueous resin dispersion were added. This corresponds to a resin content of 12.5 per cent based on the cellulose content of the solution. After thoroughly mixing the resin dispersion with the viscose, the solution was spun by extrusion into a fixing bath containing sulfuric acid and sodium sulfate to form a 60 filament 100 denier yarn. The yarn was skeined, washed free of acid by a series of water washes and desulfurized in a sodium sulfide bath. The yarn was then washed free of alkali by a series of water washes and bleached in a sodium hypochlorite bleaching bath. After bleaching, the yarn was washed free of bleach and steeped in a 0.5% hydrochloric acid solution, then washed free of acid and dried.

The yarn resulting from the above procedure showed increased tensile strength over regular rayon, and also increased flexibility and elasticity.

Example 2

A resin was prepared by heating 1716 parts by weight of the terpene-maleic anhydride condensate used in Example 1 with 178 parts of ethylene glycol, 356 parts of diethylene glycol and 450 parts of triethylene glycol at a temperature of about 220° C. for about 6 hours. After removal of excess glycols under reduced pressure a resin having an acid number of 35 to 40 and a melting point of 65° C. was obtained. This resin was then dissolved in alcohol to give a 75 per cent by weight solution and 333 parts by weight of this solution dispersed in 627 parts by weight of water containing 40 parts by weight of 28 per cent ammonium hydroxide. The resulting dispersion contained 25 per cent by weight of resin. To 100 parts by weight of a viscose spinning solution having the composition as in Example 1, 4 parts by weight of the aqueous resin dispersion were added, giving a resin content of 14.3 per cent based on the cellulose content. The procedure of Example 1 was followed for preparing the spinning solution, spinning and finishing the yarn. A yarn having improved tensile strength was obtained.

Example 3

A resin was prepared by reacting 990 parts by weight of the terpene-maleic anhydride condensate used in Example 1 with 352 parts by weight of glycerol and 716 parts by weight of stearic acid at a temperature of 210° C. for 4 to 5 hours. The resulting resin had an acid number of 58 and a melting point of 54° C. To 150 parts by weight of the resin in molten condition 42 parts by weight of 28 per cent ammonium hydroxide were added. The viscous soap resulting was diluted with 810 parts by weight of water and the mixture warmed at 70 to 80° C. with stirring until until a homogeneous dispersion resulted. Then a modified viscose solution was prepared by adding 6.6 parts by weight of the resin dispersion to 100 parts by weight of a ripened viscose solution having the composition as in Example 1. The modified viscose solution was extruded into a fixing bath as in Example 1 and a 60 filament 100 denier yarn prepared. After finishing as in Example 1 the yarn obtained possessed improved tensile strength over regular rayon yarn, had a soft handle and was delustered to a satisfactory extent.

While the invention is described specifically in relation to the viscose process of producing rayon, it will be appreciated that it is also applicable to cuprammonium cellulose solutions in a similar manner to yield cellulose filaments of similar properties.

It will be understood that the details and examples hereinbefore set forth are illustrative only, and that the invention as broadly described and claimed is in no way limited thereby.

What I claim and desire to protect by Letters Patent is:

1. A viscose spinning solution containing a terpene-maleic anhydride, polyhydric alcohol resin as a modifying agent.

2. A viscose spinning solution containing an aqueous dispersion of a terpene-maleic anhydride, polyhydric alcohol resin as a modifying agent.

3. A viscose spinning solution containing an aqueous dispersion of a terpene-maleic anhydride, glycol resin as a modifying agent.

4. A viscose spinning solution containing an aqueous dispersion of a terpene-maleic anhydride, fatty acid, glycerol resin as a modifying agent.

5. A viscose spinning solution containing an aqueous dispersion of a terpene-maleic anhydride, ethylene glycol resin as a modifying agent.

6. A viscose spinning solution containing an aqueous dispersion of a terpene-maleic anhydride, stearic acid, glycerol resin as a modifying agent.

7. A cellulose filament spun from a viscose spinning solution containing a terpene-maleic anhydride, polyhydric alcohol resin as a modifying agent, said filament containing the said resin intimately incorporated therein, and said filament being characterized by improved tensile strength as compared with a similar filament without the resin.

8. A cellulose filament spun from a viscose spinning solution containing a terpene-maleic anhydride, glycol resin as a modifying agent, said filament containing the said resin intimately incorporated therein, and said filament being characterized by improved tensile strength as compared with a similar filament without the resin.

9. A cellulose filament spun from a viscose spinning solution containing a terpene-maleic anhydride, ethylene glycol resin as a modifying agent, said filament containing the said resin intimately incorporated therein, and said filament being characterized by improved tensile strength as compared with a similar filament without the resin.

10. A cellulose filament spun from a viscose spinning solution containing a terpene-maleic anhydride, fatty acid, glycerol resin as a modifying agent, said filament containing the said resin intimately incorporated therein, and said filament being characterized by improved tensile strength as compared with a similar filament without the resin.

11. A cellulose filament spun from a viscose spinning solution containing a terpene-maleic anhydride, stearic acid, glycerol resin as a modifying agent, said filament containing the said resin intimately incorporated therein, and said filament being characterized by improved tensile strength as compared with a similar filament without the resin.

GEORGE A. PAINE.